US006885863B2

(12) United States Patent
Parkman et al.

(10) Patent No.: US 6,885,863 B2
(45) Date of Patent: Apr. 26, 2005

(54) PRECOORDINATION OF RETURN LINK FOR HAND-OFF BETWEEN COVERAGE AREAS BEING TRAVERSED BY A MOBILE TRANSCEIVER PLATFORM

(75) Inventors: David S. Parkman, Mercer Island, WA (US); Gary V Stephenson, Bellevue, WA (US); Richard A. Hellman, Redmond, WA (US)

(73) Assignee: The Boeing Company, Chicago, IL (US)

( * ) Notice: Subject to any disclaimer, the term of this patent is extended or adjusted under 35 U.S.C. 154(b) by 478 days.

(21) Appl. No.: 09/945,089

(22) Filed: Aug. 31, 2001

(65) Prior Publication Data

US 2004/0092263 A1 May 13, 2004

(51) Int. Cl.[7] .................................................. H04Q 7/20
(52) U.S. Cl. ........................ 455/427; 455/436; 455/431
(58) Field of Search ............................... 455/12.1, 13.1,
455/427, 428, 430, 431, 436, 437, 438,
439; 370/316

(56) References Cited

U.S. PATENT DOCUMENTS

| | | | |
|---|---|---|---|
| 5,669,061 A | | 9/1997 | Schipper |
| 5,867,765 A | * | 2/1999 | Nilsson ..................... 455/13.1 |
| 5,920,804 A | | 7/1999 | Armbruster et al. |
| 6,061,562 A | * | 5/2000 | Martin et al. ............... 455/431 |
| 6,104,926 A | | 8/2000 | Hogg et al. |
| 6,108,539 A | | 8/2000 | Ray et al. |
| 6,122,507 A | * | 9/2000 | Gerard et al. ............... 455/428 |
| 6,137,783 A | * | 10/2000 | Sallberg ..................... 370/316 |
| 6,185,430 B1 | | 2/2001 | Yee et al. |
| 6,201,797 B1 | * | 3/2001 | Leuca et al. ................ 370/316 |
| 6,507,739 B1 | * | 1/2003 | Gross et al. ................ 455/431 |
| 2002/0049055 A1 | * | 4/2002 | Matthews et al. ........... 455/431 |
| 2002/0168971 A1 | * | 11/2002 | Parkman ..................... 455/427 |

FOREIGN PATENT DOCUMENTS

| | | |
|---|---|---|
| EP | 0 721 259 A1 | 7/1996 |
| GB | 2 320 992 A | 7/1998 |
| WO | WO 96/31017 | 10/1996 |
| WO | WO 97/24897 | 7/1997 |
| WO | WO 00/14987 | 3/2000 |

OTHER PUBLICATIONS

International Search Report dated Aug. 31, 2001 for PCT/US02/23792, 7 pages.

* cited by examiner

*Primary Examiner*—Erika Gary
*Assistant Examiner*—S. Smith
(74) *Attorney, Agent, or Firm*—Harness Dickey & Pierce P.L.C.

(57) ABSTRACT

A system and method for carrying out a hand-off of a satellite-based communications link with a mobile platform, such as an aircraft, leaving a first coverage region and entering a second coverage region. A land-based communications link connects ground stations in each of the coverage regions for communications with one another and also with a network operations center (NOC). As the aircraft enters an area of overlap between the two coverage regions, a sequence of communications is initiated between the ground stations and also between each of the ground stations and the aircraft to ensure that new forward link and return link assignments are received by the aircraft before the aircraft relinquishes its communications link with the first ground station to begin communicating with the second ground station. The hand-off in communications is accomplished in less than approximately 30 seconds of time after one of the ground stations detects that the aircraft has entered a predefined overlap area between the two coverage regions.

17 Claims, 4 Drawing Sheets

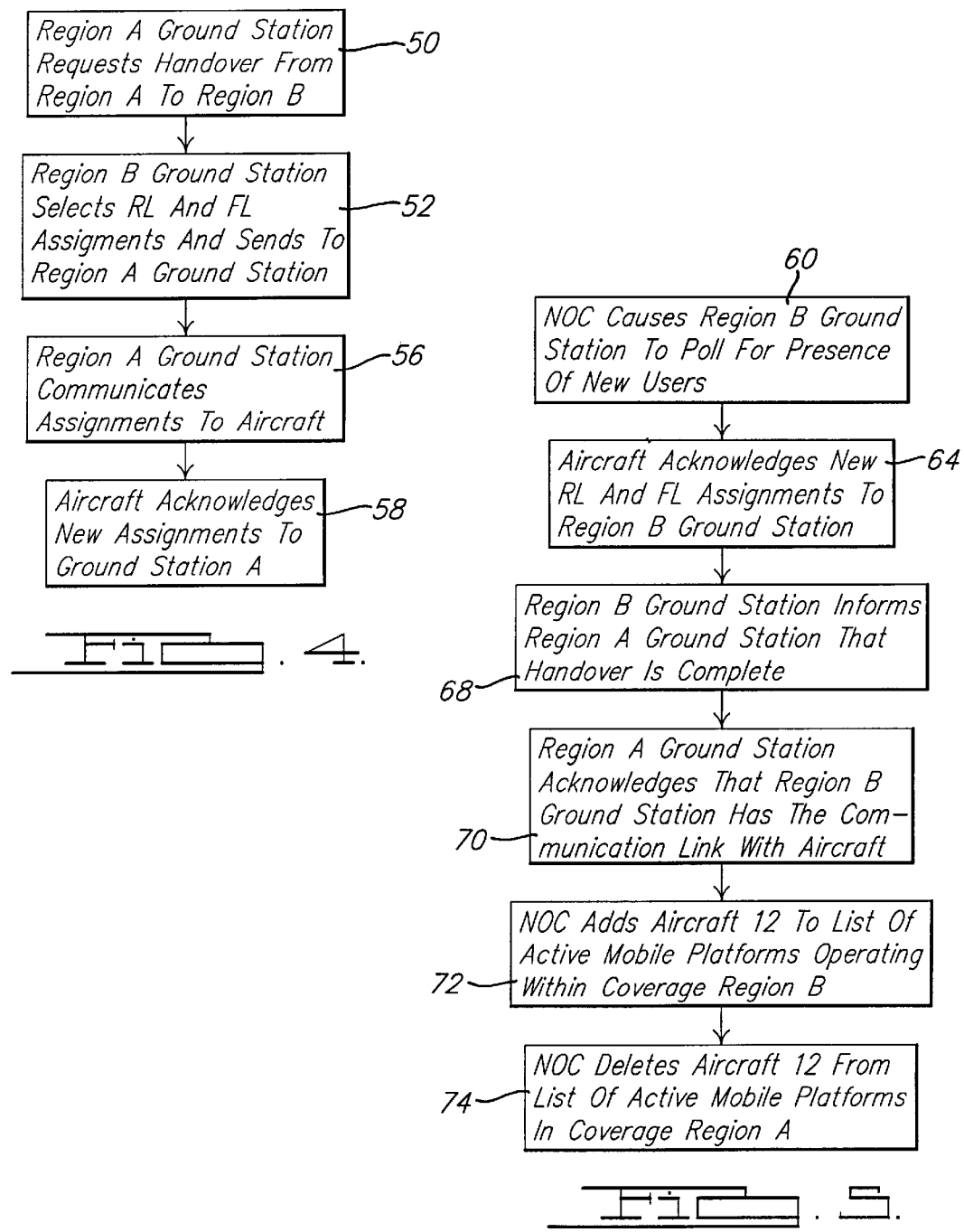

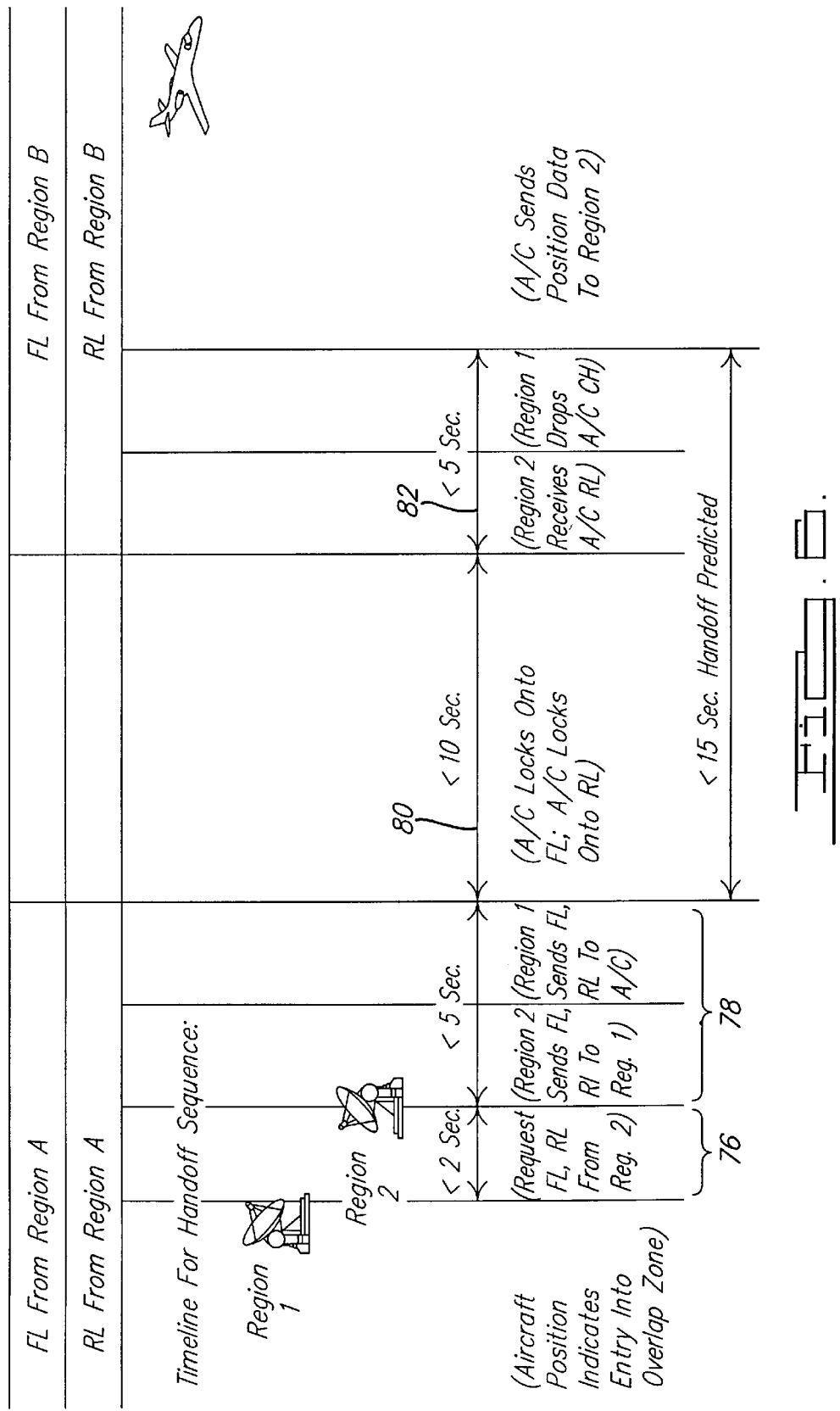

US 6,885,863 B2

PRECOORDINATION OF RETURN LINK FOR HAND-OFF BETWEEN COVERAGE AREAS BEING TRAVERSED BY A MOBILE TRANSCEIVER PLATFORM

FIELD OF THE INVENTION

This invention relates to ground-to-air communications via satellite communications links, and more particularly to a system for coordinating a hand-off of a return communications link between a mobile platform, such as an aircraft, leaving a first coverage region and entering a second coverage region.

BACKGROUND OF THE INVENTION

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of broadcast television (TV) services are available to terrestrial users via satellite links. Such services include commercial Direct Broadcast Satellite (DBS) services (such as DirecTV® and EchoStar®) and custom video, such as rebroadcast video, over private Fixed Satellite Services (FSS) or Broadcast Satellite Services (BSS) satellites. The data services which can be provided via satellite link include all conventional Internet services (e.g., email, web browsing, NetMeeting, etc.), as well as virtual private networks (VPNs) for corporate and government customers.

Previously developed systems which have attempted to provide Internet services between a mobile platform and one or more ground stations have encountered significant difficulties in maintaining the communications link between the mobile platform and a ground based station as the mobile platform leaves one coverage region and enters a second coverage region. In such instances, where the mobile platform is required to transition from communicating with a first ground based RF transceiver located within a first coverage region to communicating with a second ground based RF transceiver located within a second coverage region, coordinating the hand-off of the communication link from the first ground station to the second ground station presents a problem. The first ground station needs to be apprised when the mobile platform is about to leave its coverage region, and with sufficient advance notice that the first and second transceivers associated with the two ground stations can coordinate transferring the communications link with the mobile platform. More specifically, the two ground stations need to communicate with one another and with the mobile platform so that the mobile platform can be instructed to relinquish its communications link with the first ground based station prior to establishing a communications link with the second ground based station.

It is also important for both of the ground based transceivers to be apprised when the hand-off is complete. When the mobile platform involved is an aircraft moving at a high rate of speed, this problem can be exacerbated. Depending upon the distance or area of overlap between the two coverage regions, only a very limited amount of time may be available to establish a new communications link as the aircraft leaves the first coverage region and enters the second coverage region.

In view of the foregoing, it is a principal object of the present invention to provide a system and method for coordinating the break of an existing return communications link between a mobile platform and a first ground based transceiver located within a first coverage region, and establishing a new communications link between the mobile platform and a second ground based transceiver located within a second coverage region, where the mobile platform is communicating with the ground based transceivers via satellite transponders orbiting above each of the first and second coverage regions.

It is another object of the present invention that such a hand-off of the communications link between a mobile platform and a pair of ground-based transceivers is to be accomplished within a relatively short period of time such as, for example, less than one minute, as the mobile platform enters an area of overlap between the two coverage regions.

It is yet another object of the present invention that such a hand-off of the communications link from a first ground based transceiver to a second ground based transceiver can be accomplished with communications between each of the ground based transceivers occurring to positively inform the first ground based transceiver that a new communications link has been established with the second ground based transceiver.

SUMMARY OF THE INVENTION

The above and other objects are provided by a system and method for coordinating a return communications link hand-off for a mobile platform travelling between a pair of coverage regions. The system and method of the present invention contemplates using at least one satellite based transponder disposed in geosynchronous or non-geosynchronous orbit over a first coverage region, and where a first base transceiver is disposed in the first coverage region. At least one second satellite based transponder is disposed in geosynchronous or non-geosynchronous orbit and defines a second coverage region. A second ground based transceiver is disposed within the second coverage region. The two ground based transceivers are further coupled for communication with one another preferably via a land-based communications link.

Initially, the ground based transceiver within the first coverage region periodically receives position information from the mobile platform traveling within the first coverage region. When the mobile platform enters an area of predetermined overlap between the two coverage regions, the first ground based transceiver transmits the signal via the land-based communications link to the second ground based transceiver requesting a hand-over of the communications link to the second ground based transceiver. The second ground based transceiver then selects an assignment for the mobile platform, if more than one satellite-based transponder is available within the second coverage region, and sends the assignment back to the first ground based transceiver. This information is subsequently transmitted via the first satellite based transponder to the mobile platform. The mobile platform includes an RF transceiver system for communicating with the ground based transceivers via the satellite based transponders in each coverage region. The mobile platform then uses its transceiver to acknowledge receipt of the new assignment to the first ground based transceiver.

The second ground based transceiver then polls for the presence of the mobile platform. The mobile platform acknowledges the new assignment to the second ground based transceiver. Upon receiving this acknowledgement, the second ground based transceiver informs the first ground based transceiver, via the land-based communications link, that the hand-off is complete. Optionally, but preferably, the first ground based transceiver then transmits an acknowledgement to the second ground based transceiver that the second transceiver will thereafter have the communications link with the mobile platform.

Importantly, the above-described hand-off needs to be accomplished before the mobile platform leaves the first coverage area entirely. The present invention accomplishes the above-described hand-off in less than one minute, and in most instances within about 30 seconds or less time. Such an expeditious hand-off of the communications link is needed when the mobile platform is an aircraft traveling at a high rate of speed. In such instances, only a very limited amount of time is available to coordinate the hand-off of the communications link with the aircraft from one ground station to another. The above-described system and method accomplishes the required hand-off of the communications link with the mobile platform in an orderly manner and without the possibility of any ambiguity existing between the two ground based transceivers as to when communication with one is relinquished and the new communication link with the other is established.

BRIEF DESCRIPTION OF THE DRAWINGS

The present invention will become more fully understood from the detailed description and the accompanying drawings, wherein:

FIG. 4 represents a flow chart of the steps performed in FIG. 2 for obtaining a new assignment for the aircraft and the steps of communication between the two ground based transceivers;

FIG. 5 is a flow chart illustrating the steps performed in FIG. 3 for establishing a new communications link between the aircraft and the second ground based transceiver, in addition to the steps of communication between the two ground based transceivers in coordinating the hand-off of the communications link; and FIG. 6 is a time line illustrating the sequence of events in making a hand-off from a first ground based transceiver to the second ground based transceiver.

DETAILED DESCRIPTION OF THE PREFERRED EMBODIMENTS

The following description of the preferred embodiment(s) is merely exemplary in nature and is in no way intended to limit the invention, its application, or uses.

Figure 1:
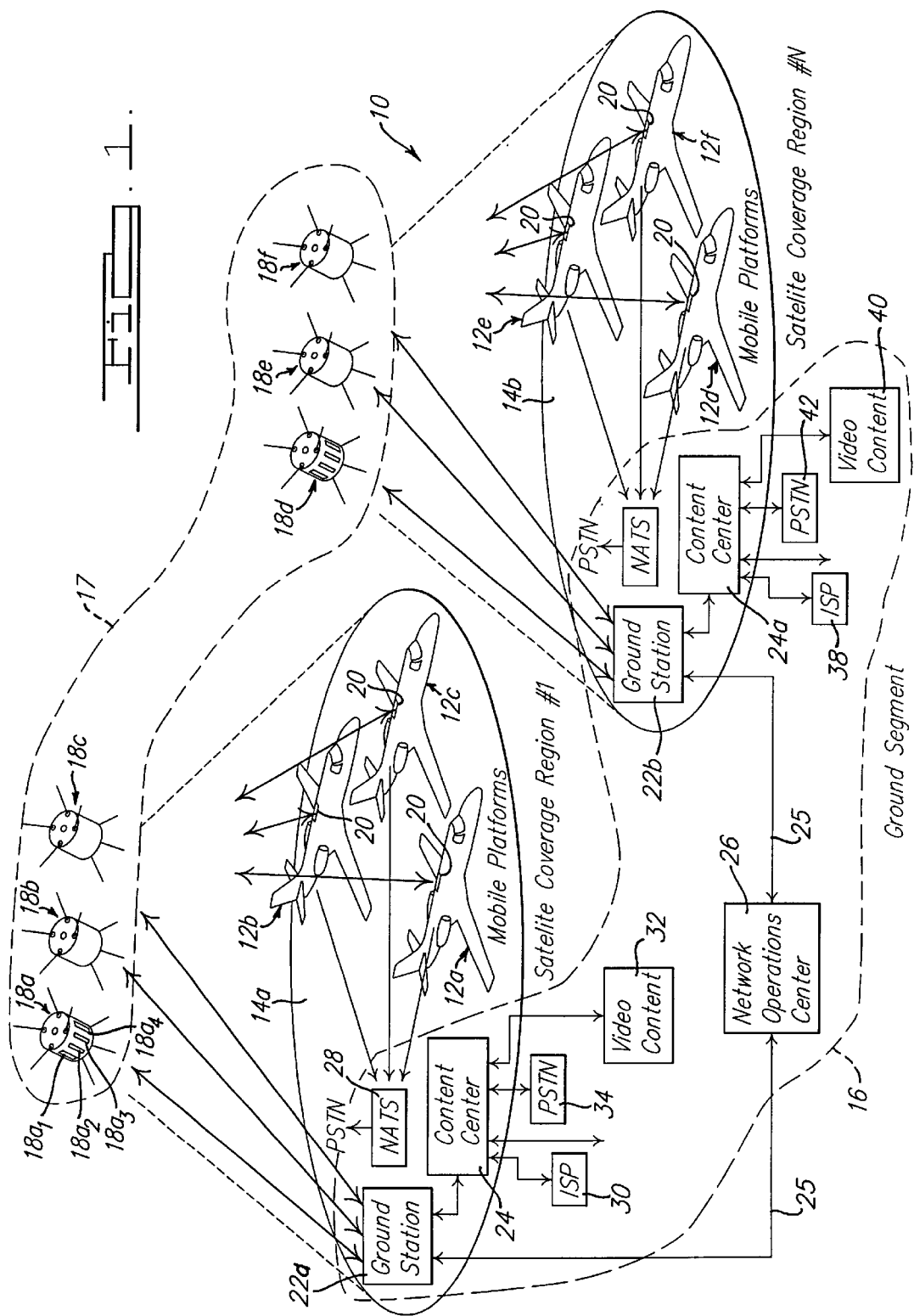
FIG. 1 is a simplified view of the major components of the system and method of the present invention, as well as several optional components, and further illustrating a pair of coverage regions having an area of overlap through which a mobile platform (i.e., an aircraft) is traveling, in addition to illustrating the land-based communications link connecting the two ground based transceivers.

Referring to FIG. 1, a description of the components and subsystems of the apparatus and method 10 of the present invention will be given so as to provide a framework for the communications link hand-off scheme of the present invention. It will be appreciated immediately that certain of the subcomponents described in connection with FIG. 1 are purely optional, but are described and illustrated nevertheless to provide the reader with an appreciation for the flexibility of the system 10 in accommodating various forms of well established air-to-ground communication systems.

The system and method 10 of the present invention contemplates managing the communications links of a plurality of moving platforms 12a–12f as the moving platforms travel from one distinct coverage region 14a to another coverage region 14b. A ground segment 16, which forms a ground based radio frequency (RF) transceiver, is disposed within the first coverage region 14a. At least one satellite 18a, but possibly a plurality of satellites 18a–18c are disposed in geosynchronous orbit (GSO) and define the boundaries of the first coverage area 14a. At least one satellite 18d, and more preferably a plurality of satellites 18d–18f, define the boundaries of the second coverage region 14b. Satellites 18d–18f are also in geosynchronous orbit. It will be appreciated, however, that non-geostationary orbit (NGSO) satellites could also be employed in lieu of geosynchronous orbit satellites.

Each of the satellites 18 includes at least one radio frequency (RF) transponder, and possibly a plurality of RF transponders. For example, satellite 18a is illustrated as having four transponders $18a_1$–$18a_4$. It will be appreciated that each other satellite 18 illustrated could have more than one RF transponder as needed to accommodate the anticipated number of mobile platforms 12 operating in its coverage region. The transponders 18 provide bent-pipe communications between the mobile platforms 12, which will hereinafter be referred to as aircraft, and the ground segment 16. Each aircraft 12 carries a mobile system (i.e., RF transceiver) 20 with transmit and receive antennas and a suitable antenna control system for causing the antennas to track the satellite within the coverage region in which it is travelling. In one preferred form the antennas may each comprise electronically steerable phased array antennas. Each mobile system 20 further may include a plurality of separate RF receivers.

The frequency bands used for these communications links could comprise any radio frequency band from approximately 10 MHz to 100 GHz. The transponders preferably comprise Ku-band transponders operating in the frequency band designated by the Federal Communications Commission (FCC) and the International Telecommunications Union (ITU) for fixed satellite services (FSS) or Broadcast Satellite Services (BSS) satellites. Also, different types of transponders may be employed (i.e., each satellite need not include a plurality of identical types of transponders) and each transponder may operate at a different frequency. Each of the transponders $18a_1$–$18a_4$ further include wide geographic coverage, high effective isotropic radiated power (EIRP) and high gain-noise temperature (G/T).

With further reference to FIG. 1, the ground segment 16 includes a ground based RF transceiver (i.e., a "ground station") 22a in bi-directional communication with a content center 24 and a network operations center (NOC) 26. The ground station 22a comprises a ground based RF transceiver. A second RF transceiver functioning as a part of a second ground station 22b is located in the second coverage region 14b employed for communicating with aircraft 12 traveling within the second coverage region 14b. The second ground station 22b likewise comprises a ground-based RF transceiver. Each of the ground stations 22a and 22b are in bi-directional communication with one another and also with a network operations center (NOC) 26. Communication between the two ground stations 22a and 22b is effected via the NOC servicing the two ground stations or between a pair of NOCs in communication with each other servicing their respective ground station using a land-based communications line 25. Each of the ground stations 22a and 22b may be located anywhere within their respective coverage regions 14a and 14b.

The content center 24 is in communication with a variety of external data content providers and it controls the transmission of video and data information received by it to the ground station 22a. The content center 24 may also be in contact with an Internet service provider (ISP) 30, a video content source 32 and/or a public switched telephone network (PSTN) 34. The video content source 32 can provide live television programming, for example, Cable News Network (CNN®) and ESPN®. The NOC 26 performs a variety of functions, one of which is coordinating the hand-off of the communications link between aircraft 12 traveling from one of the two coverage regions 14a or 14b to the other coverage region. The content center 24a associated with ground station 22b in the second coverage region 14b is also preferably in communication with an ISP 38, and/or a video content provider 40, and a PSTN 42. An optional air telephone system 28 may also be included.

It is a principal advantage of the system and method 10 of the present invention that the NOC 26 is able to coordinate a hand-off of the communications link between aircraft 12 leaving one coverage region 14a or 14b and entering the other coverage region, in an orderly fashion, and within a very short amount of time. Typically, this hand-off needs to be accomplished within about one minute, depending, of course, on the size of the overlap region of the two coverage regions 14a and 14b. In many instances it is anticipated that this hand-off will need to be accomplished in about 30 seconds or even slightly less time.

Figure 2:
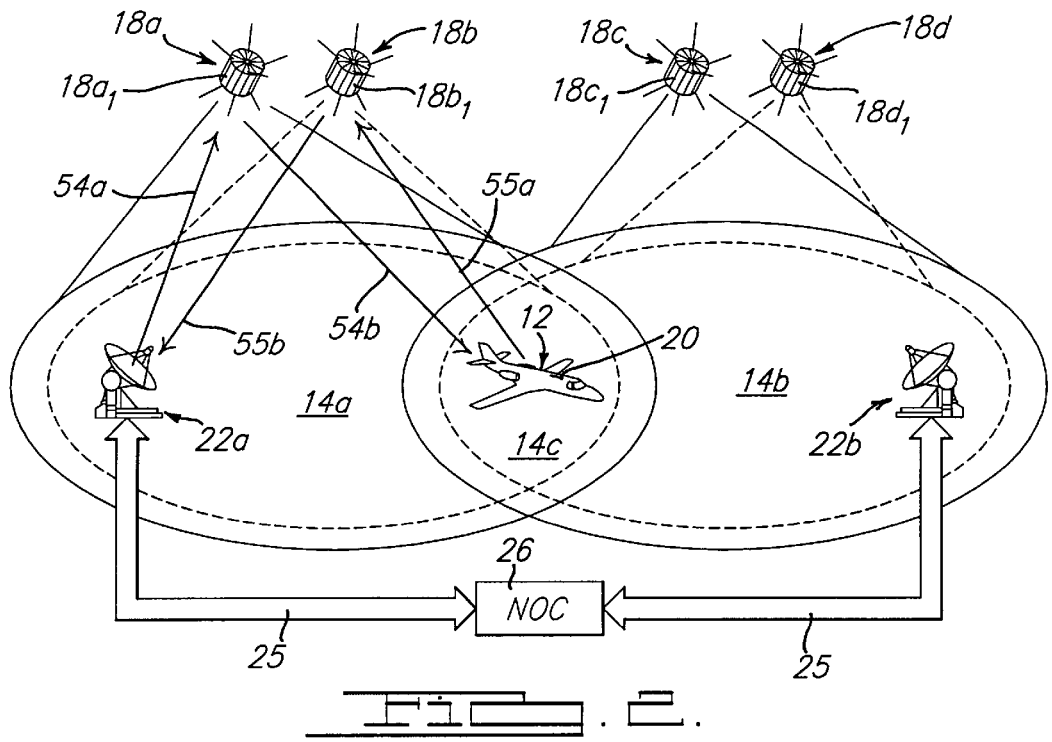
FIG. 2 illustrates the sequence of communications between the mobile platform and the first ground based transceiver within the overlap region.

Turning to FIG. 2, the communications link hand-off procedure of the present invention will be described. For simplicity, several of the optional components of FIG. 1 have been omitted. Also, only two satellites 18 have been illustrated as being used within each coverage region 14a and 14b. It will be noted immediately that an area of overlap 14c exists between the coverage regions 14a and 14b. This area of overlap can vary significantly. However, with a commercial or military aircraft traveling at a high rate of speed, often in excess of 500 mph, the hand-off needs to be completed in an orderly and very expeditious manner so that the aircraft 12 remains in essentially constant communication with one or the other of the ground stations 22a or 22b. Merely for the purpose of example, each of satellites 18a, 18b, 18c and 18d will be described as carrying a single transponder, $18a_1$, $18b_1$, $18c_1$ and $18d_1$, respectively. Nevertheless, it will be appreciated that more than one transponder could easily be carried by any one or more of the satellites 18 depending upon the volume of traffic anticipated within the coverage regions 14a and 14b.

Referring to FIGS. 2 and 4, aircraft 12 periodically reports its position within coverage region 14a by transmitting signals via its mobile system 20 to an assigned "return link" transponder $18b_1$ carried by satellite 18b. The term "return link" is used to denote communication from the aircraft 12 back to the ground station 22a via one of the satellites 18. The term "forward link" is used to denote any communication from one of the ground stations 22a or 22b to the aircraft 12. The aircraft 12 further operates in coordination with assigned forward link and return link channels when operating within a given coverage region 14a or 14b. Preferably, a "public key" is also provided to the mobile system 20 of the aircraft 12 so that a suitable encryption scheme can be employed in connection with the data content transmitted between the ground stations 22a, 22b and the aircraft 12.

With further reference to FIGS. 2 and 4, the first step in initiating a hand-off of the communication link with the aircraft 12 from region 14a to region 14b involves having the ground station 22a request a hand-off from the NOC 26, as indicated at step 50 in FIG. 4. This step also involves having ground station 22a request the public keys needed to decrypt information transmitted by the ground station 22b if encryption is being used with the data content being transmitted by transceiver 22b. This request for a hand-off is initiated by ground station 22a when it detects that the aircraft 12 has entered the area of overlap 14c of the two coverage regions 14a and 14b.

Next, the NOC 26 selects forward link and return link assignments which the aircraft 12 is to use when it begins communicating with the transponders $18c_1$ and $18d_1$ of satellites 18c and 18d, respectively, as indicated at step 52 of FIG. 4. This step also involves having the ground station 22b transmit to ground station 22a, via the NOC 26, a "traffic key" wrapped in the platform public key, if encryption is being used. The "traffic key" is preferably a 168 bit Triple DES symmetric traffic encryption key (per FIPS PUB 46-3, hereby incorporated by reference into the present application), wrapped in the asymmetric public key of the recipient.

Once the ground station 22a has received the forward link and return link transponder assignments from ground station 22b, it transmits this information via satellite 18a to the aircraft 12, as indicated by arrows 54a and 54b, and as also indicated at step 56 in FIG. 4. The aircraft 12 then acknowledges the new assignments via signals transmitted from its mobile transceiver 20 via the return link transponder $18b_1$ of satellite 18b, as indicated at step 58 in FIG. 4, and by arrows 55a and 55b.

Figure 3:
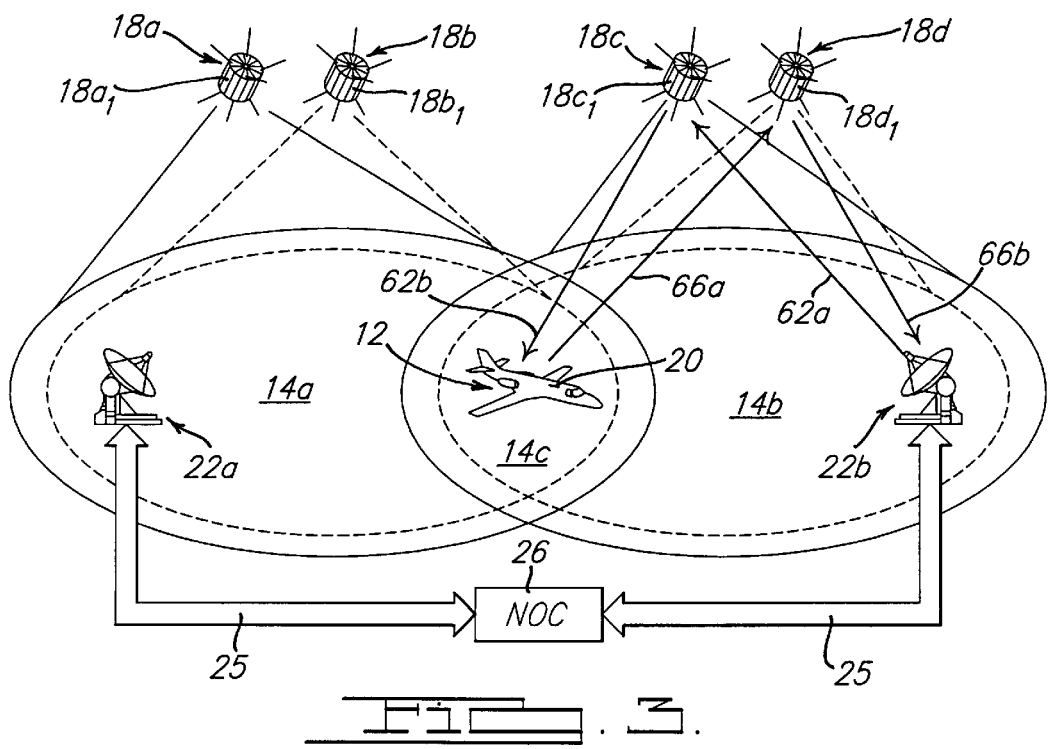
FIG. 3 illustrates the sequence of communications between the mobile platform and the second ground based transceiver.

Referring now to FIGS. 3 and 5, the steps of establishing the new communications link between the aircraft 12 and the ground station 22b of region 14b will be described. Initially, the NOC 26 begins polling for the presence of the new user (i.e., aircraft 12), as indicated at step 60 in FIG. 5. This polling is accomplished by a signal transmitted to a designated forward link transponder, which in this example is transponder $18c_1$ carried by satellite 18c. Arrows 62a and 62b represent this forward communications link signal.

Once the aircraft 12 receives the polling signal from ground station 22b, it transmits an acknowledgement signal back to ground station 22b acknowledging the new return link and forward link assignments, as indicated at step 64 in FIG. 5. This acknowledgement signal is transmitted via the assigned return link transponder, which in this example comprises the transponder $18d_1$ of satellite 18d. This return link is also designated in FIG. 3 by arrows 66a and 66b.

Once the ground station 22b receives the acknowledgement from the aircraft 12, ground station 22b transmits a signal to the NOC 26 via the land-based communications line 25 that the hand-off has been accomplished, as indicated at step 68 in FIG. 5. The NOC 26 then relays this information to the ground station 22a. The ground station 22a then transmits an acknowledgement via the land-based communications line 25 and the NOC 26 to ground station 22b acknowledging that ground station 22b now has communication with the aircraft 12, as indicated at step 70. Once this occurs, the NOC 26 adds aircraft 12 to the list of active mobile platforms in communication with ground station 22b, as indicated at step 72. Finally, the NOC 26 deletes aircraft 12 from the list of active mobile platforms in communication with ground station 22a, as indicated at step 74.

Referring now to FIG. 6, a time line for the hand-off sequence described in connection with FIGS. 2–5 is illustrated. This time line illustrates approximate times within which each step of the above-described hand-off sequence is accomplished. Requesting the forward link and return link assignments from the ground station 22b of region 14b takes approximately two seconds or less, as indicated by time interval 76. The steps of causing the ground station 22b to transmit the forward link (FL) and return link (RL) assignments via the land-based communications line 25 to ground station 22a and causing ground station 22a to transmit these assignments to the aircraft 12 comprises approximately 5 seconds or less, as indicated by time interval 78. Within about 10 seconds or less, the aircraft 12 locks onto the forward link and return link assignments, as indicated by time interval 80. The ground station 22b then receives the acknowledgment from the aircraft 12 via the assigned return link and ground station 22a relinquishes the communications link with the aircraft 12 while the NOC 26 removes the aircraft from its list of active mobile platforms. This occurs within a time span of about 5 seconds or less, as indicated by time interval 82. Thereafter, the aircraft 12 begins sending its position data to ground station 22b. Accordingly, the entire hand-off sequence is accomplished well within 30 seconds from the time that the aircraft 12 enters the area of overlap 14c between the coverage regions 14a and 14b.

The apparatus and method 12 of the present invention thus provides a means for ensuring an orderly transfer of communication from a first ground station located within a first coverage region to a second ground station located within a second coverage region as a mobile platform leaves the first coverage region and enters the second coverage region. While the foregoing example has been described in connection with an aircraft, it will be appreciated that the described hand-off sequence could just as readily be employed with a ship or any other mobile platform which is required to travel between two or more contiguous coverage regions. Importantly, the hand-off scheme provided by the present invention enables communication of the aircraft to be accomplished within a very short time span.

Those skilled in the art can now appreciate from the foregoing description that the broad teachings of the present invention can be implemented in a variety of forms. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A method for coordinating a hand-off of communication from a mobile radio frequency (RE) transceiver on a mobile platform leaving a first coverage region, wherein it is in communication with a first satellite-based transponder and also with a first base station, to communicate via a second satellite-based transponder with a second base station residing within a second coverage area;

defining an overlap region between said first and second coverage areas;

using said first base station to determine when said mobile platform has entered said overlap region;

using said first base station to obtain a communication link assignment from said second base station and to relay said communication link assignment to said mobile platform via said first satellite based transponder; and causing said mobile platform to transmit a signal to said second base station, via said second satellite-based transponder, acknowledging receipt of said communication link assignment before said first base station releases communications assets assigned to said mobile platform.

2. The method of claim 1, further comprising the step of causing said second base station to transmit a signal to said first base station informing said first base station that said hand-off is complete.

3. The method of claim 1, further comprising the step of causing said mobile platform to transmit a signal to said first base station acknowledging receipt of said communication link assignment.

4. The method of claim 1, further comprising the step of coupling said first and second base stations via a land-based communication line.

5. The method of claim 1, wherein said hand-off is completed within less than sixty seconds after said first base station requests said second base station to provide said communication link assignment.

6. The method of claim 1, wherein the step of said second base station providing said communication link assignment comprises providing a public key for decrypting subsequently transmitted encrypted information from said base station.

7. A method for coordinating a hand-off of communication from a mobile radio frequency (RE) transceiver on a mobile platform travelling within a first coverage region and communicating with a first ground based transceiver station via a first satellite transponder, to a second ground-based transceiver disposed within a second coverage area via a second satellite transponder as said mobile platform leaves said first coverage area and enters said second coverage area, said method comprising the steps of:

a) defining said first coverage area;

b) defining said second coverage area such that an area of overlap exists between said first and second coverage areas;

c) placing said first and second ground-based transceivers in communication with each other via a land-based communication line;

d) having said mobile platform periodically report its position to said first ground-based transceiver;

e) using said first ground-based transceiver to determine when said mobile platform has entered said area of overlap and to request from said second ground-based transceiver a hand-off of communication with said mobile transceiver from said first ground-based transceiver to said second ground-based transceiver;

f) using said second ground-based transceiver to transmit transponder assignment information concerning said second satellite transponder to said first ground-based transceiver;

g) using said first ground-based transceiver to transmit said assignment information to said mobile platform via said first satellite transponder;

h) using said second ground-based transceiver to poll said mobile platform to verify a presence of said mobile platform within said area of overlap; and i) using said mobile transceiver to transmit an acknowledgement to said second ground-based transceiver via said second satellite-based transponder, to acknowledge receipt of said assignment information in response to said poll, whereafter said mobile platform communicates with said second ground-based transceiver rather than said first ground-based transceiver.

8. The method of claim 7, further comprising the step of:

after receiving said assignment information from said first ground-based transceiver, causing said mobile transceiver to transmit a signal acknowledging reception of said assignment information back to said first ground-based transceiver.

9. The method of claim 7, further comprising the step of:

after receiving said acknowledgement from said mobile transceiver at said second ground-based transceiver, using said second ground-based transceiver to inform said first ground-based transceiver that said hand-off is complete.

10. The method of claim 9, further comprising the step of having said first ground-based transceiver transmit an acknowledgement signal to said second ground-based transceiver acknowledging that said second ground-based transceiver has taken over communication with said mobile transceiver.

11. The method of claim 7, wherein step f) comprises the step of transmitting a public key to said mobile transceiver; and wherein said public key enables said mobile transceiver to decrypt subsequently encrypted data transmitted from said second ground-based transceiver via said second satellite-based transponder.

12. A method for coordinating a hand-off of communication from a mobile radio frequency (RE) transceiver on a mobile platform from a first base station to a second base station as said mobile platform travels from a first coverage region into a second coverage region, the method comprising the steps of:

defining an area of overlap between said first and second coverage areas;

when said mobile platform enters said overlap area, causing said second base station to transmit, via a land based communications line coupling said base stations, a new communication link assignment to said first base station;

using said first base station to relay said new communication link assignment, via a first satellite-based transponder orbiting within said first coverage area, to said mobile RF transceiver; and causing said mobile transceiver to transmit an acknowledgement signal, via a second satellite-based transponder orbiting within second coverage area, to said first base station, that said mobile platform has received said new communications link assignment.

13. The method of claim 12, further comprising the step of causing said mobile platform to periodically report its position to said first base station.

14. The method of claim 12, further comprising the step of causing said mobile RF transceiver to transmit an acknowledgement signal to said second base station acknowledging reception of said new communications link assignment.

15. The method of claim 14, further comprising the step of causing said second base station to transmit a return acknowledgement signal to said first base station after receiving said acknowledgement signal from said mobile RF transceiver.

16. The method of claim 15, further comprising the step of causing said first base station to transmit a reply acknowledgement to said second base station acknowledging that said hand-off is complete.

17. A system for enabling a hand-off of communications from a mobile platform communicating with a first base station in a first coverage region via a first satellite based transponder, to a second base station in a second coverage region via a second satellite based transponder, comprising:

a radio frequency (RF) transceiver disposed on said mobile platform;

a first base station having an RF transceiver and being located in said first coverage region;

a second base station having an RF transceiver and being located in said second coverage region;

a land based communications line coupling said first and second base stations;

a network operations center (NOC) in communications with each of said base stations via said land based communications line; and wherein said NOC coordinates a hand-off of communications between said mobile platform and said first base station to said second base station by:

detecting when said mobile platform enters a region of overlap between said coverage regions;

causing said second base station to transmit transponder related assignment information to said first base station;

causing said first base station to relay said assignment information to said mobile platform via said first satellite-based transponder;

causing said second base station to poll said mobile platform;

causing said mobile platform to respond to said poll via said second satellite-based transponder, to acknowledge receipt of said assignment information; and causing said second base station to inform said first base station that a communications link with said mobile platform has been established.

* * * * *